March 30, 1943.  D. S. KANE  2,315,335
FASTENING DEVICE
Filed April 18, 1942
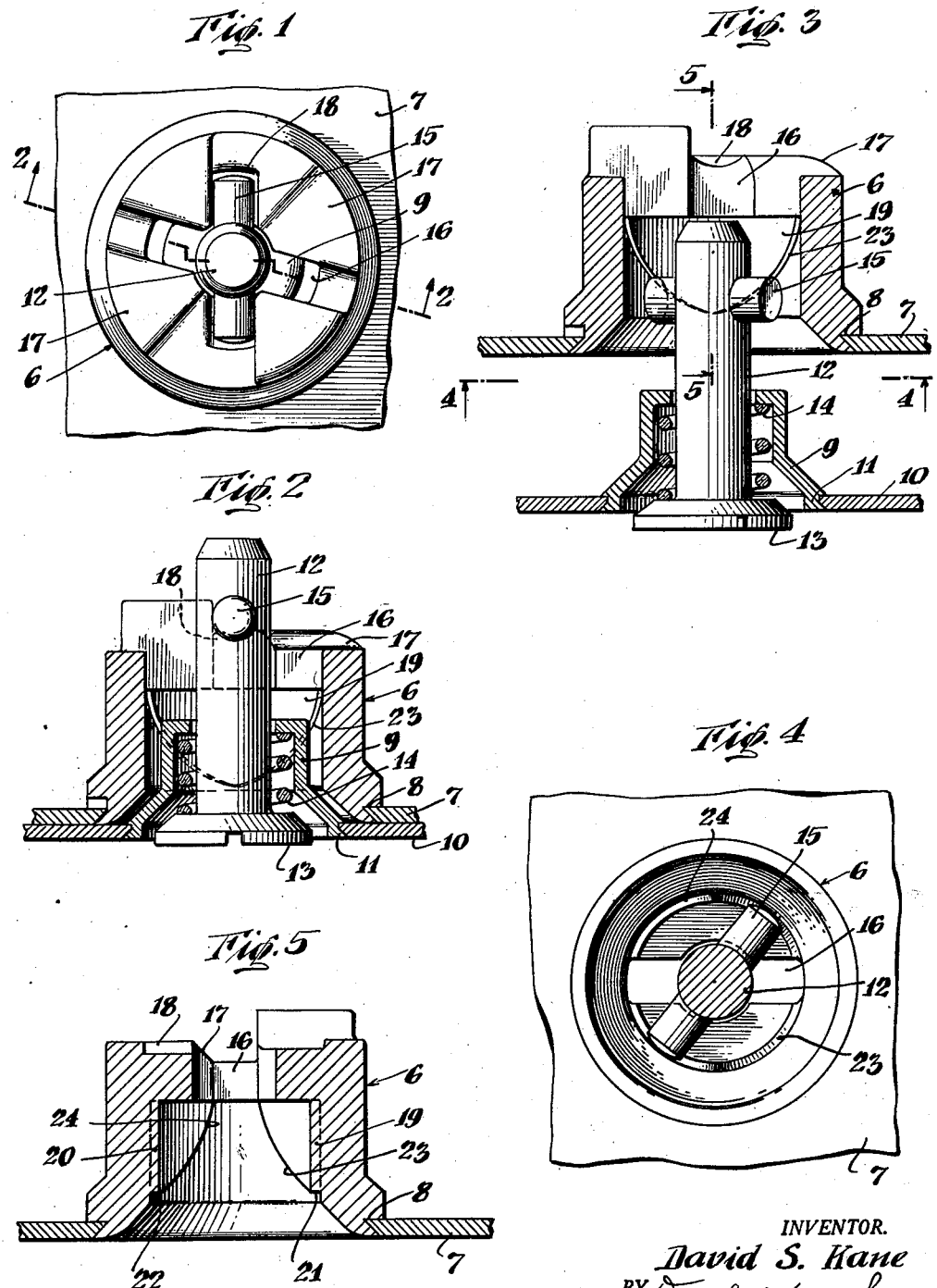
INVENTOR.
David S. Kane
BY
ATTORNEYS Patented Mar. 30, 1943

2,315,335

UNITED STATES PATENT OFFICE 2,315,335

FASTENING DEVICE

David S. Kane, Roslyn, N. Y., assignor to J. Mills Summers, Englewood, N. J.

Application April 18, 1942, Serial No. 439,499

7 Claims. (Cl. 24—221)

This invention relates to an improvement in fastening devices of the quick operating type such as are particularly adapted for use in aircraft and in other locations where a quick operating fastener of positive character is necessary and where resistance to shear and tension loading is desirable.

An object of the invention is the provision of a fastener of this type in which during assembly, the male part may be threaded into the female part in such fashion as to preclude a false fastening of the parts and in which ready alignment of the male and female members automatically occurs.

Another object is that of providing a fastener that may be assembled by relatively unskilled labor and in which access area closures and other members carrying such fasteners may be quickly secured in place with the assurance that the fastener is ready for turning into the locking or fastened position.

With these and other objects in mind, reference is had to the attached sheet of drawings, in which:

Fig. 1 is a plan view of a fastening device embodying my invention in assembled condition with the male and female parts assembled and locked together;

Fig. 2 is a cross section of the fastener shown in Fig. 1 taken in side elevation along the lines 2—2 of Fig. 1 looking in the direction of the arrows;

Fig. 3 is a further cross sectional view in side elevation of the fastener shown in the preceding views in partially assembled condition;

Fig. 4 is a plan view of the female or socket portion of the fastener shown in Fig. 3 taken along the line 4—4 of that figure looking in the direction of the arrows and showing a fragment of the male member entering the same; and Fig. 5 is a cross section in side elevation of the female portion of the fastening device shown in Fig. 3 taken along the line 5—5 of that view looking in the direction of the arrows.

In the several views, the socket member of the fastening device or cam collar is indicated by the numeral 6. This member may be secured to a sheet of material 7 which may be, for example, a structural member of an airplane, by means of flanging the cam collar into said member as at 8. Cooperating with said cam collar is the male member or stud assembly of the fastener comprising, for example, spring retaining cup 9, a stud 12 which may be formed with a slotted manipulating head as at 13, and a spring 14 which encircles said stud and is held in position by the cup 9. The latter may be flanged as at 11 into position in an opening in an outer sheet 10 which may, for example, comprise a portion of an access area cover plate. A cross pin 15 is carried by the lower end of the stud and the stud and said cross pin project into said cam collar which is provided with a transverse opening 16 at its lower end to permit the passage of said stud and cross pin therethrough, the ends of the cross pin thereafter riding on the opposed cam surfaces 17 on the outer surface of the bottom of said stud so that by rotation of the stud, the ends of said cross pin are carried up said inclined planes 17 and finally come to rest at the detent or depression 18 formed at the top of each of said inclined planes or cam surfaces. When the cross pin is in the detent or impression 18 it is held under the tension of the spring 14 against further accidental movement and the male and female members are locked together, holding with them the structural members to which they are flanged.

Heretofore, in assembling and threading the stud assembly into the cam collar of similar types of fasteners, it has been difficult to align the cross pin 15 with the opening 16 in the bottom of the cam collar, and consequently, unskilled or impatient mechanics have oftentimes attempted to force the cross pin through the base of the cam collar when it was not in alignment with the opening 16. This has resulted in damage to the cam collar and in some instances, has even caused it to be torn from its flanged position 8 in the member 7. In order to prevent this from occurring, I have provided shoulders 19 and 20 in the interior of the cam collar. These shoulders are formed with apexes 21 and 22 adjacent the top of the cam collar and have convex surfaces 23 and 24 extending downwardly from said apexes to either side of the opening 16. The overall length of the cross pin 15 carried by the stud is such that when the stud is introduced into the cam collar, the ends of the cross pin ride against the surfaces 23 and 24 of the shoulders 19 and 20 which in turn deflect the cross pin as it cams along the same so that the cross pin and stud assembly are rotated until their position of alignment with the opening 16 is achieved. In this way it is impossible to insert the stud and cross pin improperly within the cam collar, as contact with the shoulders 19 and 20 automatically causes proper alignment of the cross pin 15 and the opening 16 to occur.

It is, of course, obvious that many changes might occur in the design of this structure without in the least departing from the spirit of my invention.

I claim:

1. A fastening device comprising a stud, a cross-pin associated therewith, a cam collar formed with a bottom opening and adapted to receive said stud and cross-pin therethrough when said device is assembled, and a shoulder guide portion carried by said cam collar for cooperation with the opposed ends of said cross-pin to effect rotation of said stud and alignment of said cross-pin with said cam collar bottom opening.

2. A fastener as provided for in claim 1 in which the guide portion comprises inclined shoulder surfaces formed on the inner wall of said collar.

3. A fastener as provided for in claim 1 in which the shoulder guide portion is provided with inclined convex guiding surfaces.

4. A fastener as provided for in claim 1 in which the guide portion comprises two shoulders, one on either side of said cam collar bottom opening, each of said shoulders provided with cross pin guiding surfaces adapted to guide said cross pin into alignment with said opening.

5. A fastener as provided for in claim 1 in which the guide portion comprises two shoulders, one on either side of said cam collar bottom opening, each of said shoulders having cross pin guiding surfaces diverging from apexes near the top of the cam collar to points adjacent either side of the cam collar bottom opening.

6. In a socket member adapted for use in a fastening device, a guiding surface comprising shoulder portions positioned inside of said socket and having guiding surfaces diverging from apexes adjacent the top of the socket to points adjacent the bottom of said socket.

7. In a fastener having a socket portion provided with a bottom opening through which an engaging means of a stud assembly must pass, means for aligning said engaging means with said opening comprising shoulders on said socket and disposed to each side of said opening and having guiding surfaces extending from a point adjacent the point of entry of said stud into said socket to points adjacent each side of said opening, said shoulders adapted to receive and guide said engaging means through said opening.

DAVID S. KANE.